3,413,220
PROCESS FOR TREATING BRINE
Willie J. Sisco and Billy H. Simmons, Baton Rouge, La., assignors to The Dow Chemical Company, Midland, Mich., a corporation of Delaware
Filed Jan. 30, 1967, Ser. No. 612,435
5 Claims. (Cl. 210—44)

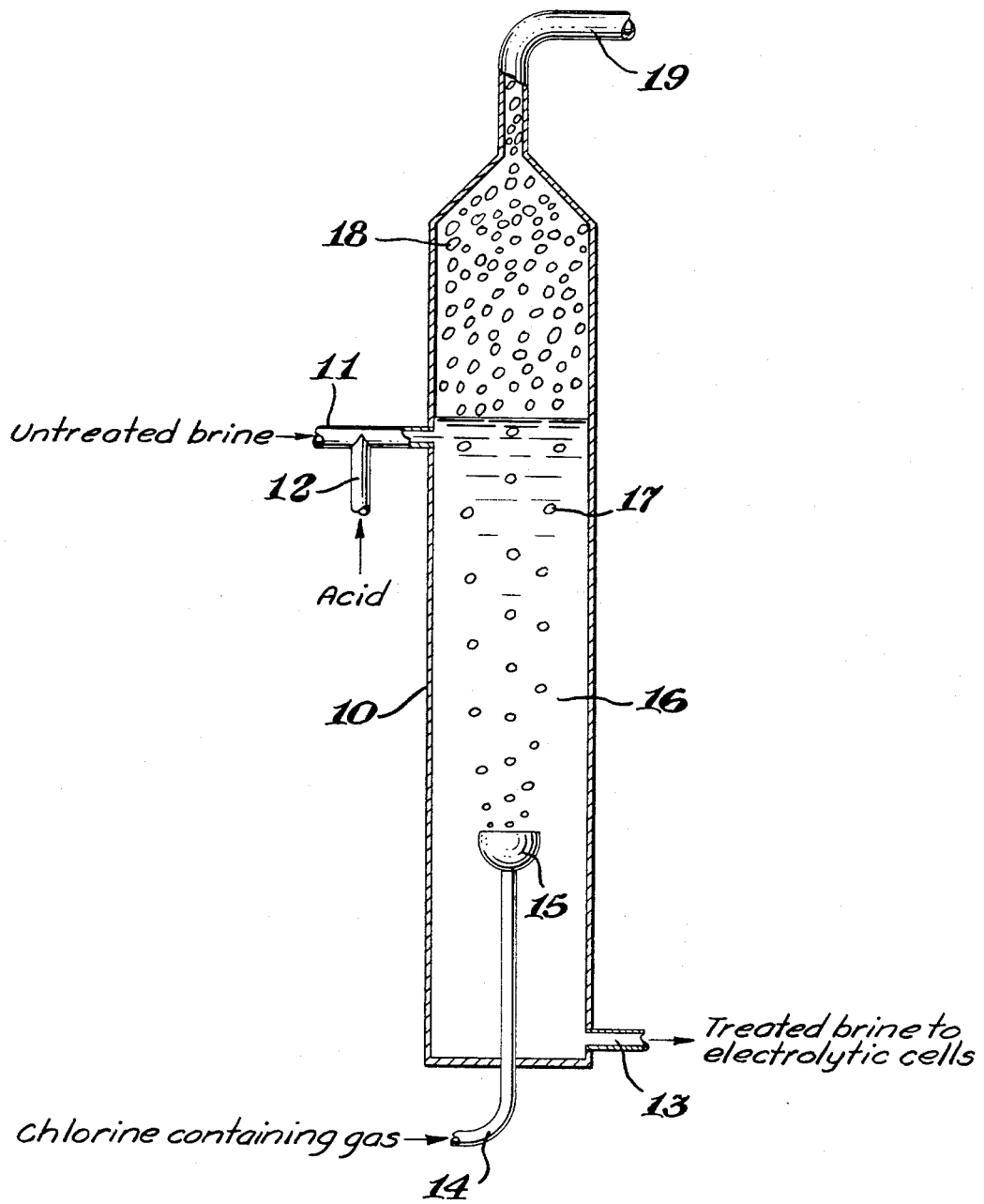

ABSTRACT OF THE DISCLOSURE

A process for reducing the foaming capacity of brines by passing a chlorine-containing gas through such brine at a rate sufficient to produce a relatively stable foam on the brine, and removing the foam from the brine to produce a brine having a significantly reduced foaming capacity.

Background of the invention

Many of the brines used in electrolytic processes for the production of chlorine contain organic matter possessing surface-active properties. The presence of such surface-active material results in the formation of foam in the electrolytic cells which impedes the passage of chlorine to the collection header and causes back pressure thereby reducing the electrical load which can be applied to the cell. Since the surface-active materials contained in such brines are usually extremely water-soluble, attempts to extract such materials with solvents have not been successful. Likewise, the use of ion exchange resins to remove the objectionable foam-forming materials and thereby reduce the foaming tendency of the brine have not been successful.

Brines used for the electrolytic production of chlorine are usually derived either from the naturally occurring brines or from brackish waters, e.g. Great Salt Lake brine or subterranean brines, or from salt domes where fresh water is used to dissolve the salt from the salt dome to produce a brine of the desired concentration. Small quantities of surface-active materials frequently occur in such brines. The nature and composition of the surface-active material varies with different brine sources but often it is some form of tannin which, during electrolysis, forms a sufficiently stable foam on the brine to impede the passage of chlorine from the cell, produce back pressure and significantly reduce cell capacity.

Summary of the invention

This invention relates to a process for the treating of brines for use in electrolytic cells and more particularly relates to a method for the treatment of brines to decrease or eliminate the foaming of such brines during electrolysis.

It is an object of this invention, therefore, to provide a process for treating foam-forming brines to reduce the foaming tendencies thereof. A further object is to provide a relatively simple and inexpensive process for treating the feed brines to electrolytic cells to reduce the foaming tendencies of such brines without impairing their usefulness in the electrolytic process. These and other objects and advantages of the present process will become apparent from a reading of the following detailed description.

It has now been discovered that the foaming tendency of brines containing surface-active materials may be eliminated or substantially decreased by intimately contacting such brines with a dispersed gaseous phase containing chlorine. The dispersed chlorine-containing gaseous phase is passed through the brine at a rate sufficient to cause foam to form on the brine. Upon separation of the foam from the brine, a brine is obtained which has little or no tendency to foam when electrolyzed. The steps of causing foam formation by passing chlorine or a chlorine-containing gas through the brine and separating the foam phase from the treated brine phase produces an improved feed brine for chlorine cells which produces little or no foam during the electrolysis and to which has been added no impurity which is detrimental to the electrolytic process.

Brief description of the drawing

The figure is a diagrammatic illustration in section elevation of an apparatus which may be used in practicing the process of the present invention.

Description of preferred embodiments

In accordance with the process of the present invention treatment of such a brine to reduce or eliminate foam formation during electrolysis is accomplished according to this invention by first passing a gaseous phase of chlorine or a chlorine-containing gas in dispersed form, e.g. by sparging, through the brine. It is important that intimate contact be made between the chlorine and the brine and that the chlorine or chlorine-containing gas be passed through the brine at a rate sufficient to produce foaming. The presence of chlorine in the gaseous phase produces a foam of sufficient stability or half-life to permit separation of the foam phase from the treated brine phase before the foam collapses and reintroduces the surface-active materials into the brine.

As the dispersed gaseous phase used to cause foaming of the brine, gaseous chlorine or gaseous mixtures of chlorine and other gases such as air, hydrogen, or nitrogen may be employed. It is desirable that where gaseous mixtures are employed, the mixture contains no gas which will remain in the treated brine phase and be detrimental to the electrolytic process. Relatively dilute mixtures of air and chlorine, e.g. containing as little as about 10 volume percent chlorine have been found useful and likewise mixtures of hydrogen and chlorine containing about 10 volume percent chlorine have been found to be useful in the process of this invention.

The feed brine to the chlorinating and foaming step preferably has a pH of less than about 5 with particularly good results being achieved at a pH between about 2.8 and about 4.6. Brines having a pH of greater than 5 are acidified with any acid not detrimental to the electrolytic process but HCl is usually preferred.

In order to achieve adequate foaming of the acidic feed brine, a flow of the chlorine-containing dispersed gas of at least about 3 standard cubic feet (s.c.f.) per 100 gallons of brine is usually required with a flow of between about 4 s.c.f. and about 7 s.c.f. per 100 gallons being preferred. If the gas feed exceeds about 9 s.c.f./100 gallons of brine foam stability begins to decrease substantially due to the high speed of the gas bubbles passing through the brine. Likewise, higher proportions of gas cause liquid loss by entrainment from the foaming step and substantial amounts of chlorine are lost in the off-gas from the foaming step.

The chlorination and foaming of the brine is advantageously conducted in a vessel having a relatively high length to diameter ratio and wherein the untreated brine is continuously fed into the column and counter-currently contacted with a dispersed chlorine-containing gas. The foam thereby produced is then continuously removed from the upper end of the column and the treated brine is continuously withdrawn from the lower end of the column. One embodiment of the invention is shown in the figure wherein defoamer column 10 is an elongated vessel with an untreated brine inlet 11 permitting the flow of untreated brine into and downwardly through the column. Untreated brine inlet line 11 is provided with acid line 12 for the introduction of acid into the brine for control of pH when required. The chlorine-containing gas passes through line 14 and is introduced into the brine through gas distributor 15. The gas is thereby broken into relatively small bubbles which pass upwardly through the brine to produce foam 18. As a sufficient volume of foam 18 is produced, it passes, together with any excess gas, from column 10 through line 19 to a collection or disposal system. The treated brine flows downwardly through column 10 and is removed through line 13.

The following examples are provided to further illustrate the invention but not to be construed as limiting its scope.

Example 1

A defoamer column was employed which had a volume of 12,000 gallons of brine and a length to diameter ratio of 10:1. The brine employed was produced from a salt dome in southern Louisiana and contained about 26 weight percent NaCl and between 10 and 20 p.p.m. of tannins. After acidification to a pH of 4.6, the brine was fed at a rate of 120,000 gallons/hour through a line near the upper end of the defoamer column. Simultaneously, a mixture of chlorine and hydrogen containing 10 volume percent chlorine was fed through a sparger or gas distributor near the bottom of the column at a rate of 7,500 standard cubic feet per hour. The foam produced was continuously removed from the top of the column and allowed to collapse or condense. The volume of brine lost as foam was found to be about 1 percent of the feed brine.

The treated brine was continuously removed from near the bottom of the column and found to have a pH of about 2.8. Samples of the treated brine were taken at intervals to determine the extent to which the foam-forming potential of the brine had been eliminated by the treatment.

In order to determine the relative capacity of the treated brine to foam, a standardized flow of chlorine was sparged into a sample of treated brine until maximum foam height is achieved and measured. The gas flow is then stopped and 25 seconds later the foam height is again measured. The percent stability of the foam is then calculated as follows:

$$\text{Percent stability} = \frac{\text{Foam height after 25 sec.}}{\text{initial foam height}} \times 100$$

After determination of the percent stability of the feed brine in the same manner the percent improvement is calculated as follows:

$$\text{Percent improvement} = \frac{\text{Percent stability (untreated brine)} - \text{percent stability(treated brine)}}{\text{Percent stability of untreated brine}} \times 100$$

The treated brine of this example showed a percent improvement of 90 percent and, when employed as the feed to a chlorine cell, produced substantially no foaming.

As a control, the same process was repeated using air as the foaming agent in the place of chlorine. The treated brine was found to have a percent improvement of only 20 percent and when introduced into an electrolytic cell produced substantial quantities of foam and created significant back pressure and lowering of capacity.

Various modifications can be made in the present invention without departing from the spirit or scope thereof for it is understood that we limit ourselves only as defined in the appended claims.

We claim:

1. A process for the treatment of brines to reduce the foaming capacity thereof which comprises contacting a foam-forming brine having a pH of less than about 5 with a dispersed gaseous phase containing at least 10 volume percent chlorine gas which is introduced into the brine phase at a rate sufficient to produce a relatively stable foam on said brine, and removing said foam from said brine to produce a brine having a reduced capacity for foaming.

2. The process according to claim 1 wherein the pH of the foam-forming brine is between about 2.8 and about 4.6 prior to contact with the dispersed gaseous phase.

3. The process according to claim 1 wherein the dispersed gaseous phase is a mixture of chlorine and hydrogen.

4. The process according to claim 1 wherein the chlorine-containing gaseous phase is contacted with the foam-forming brine at a flow rate of at least about 3 standard cubic feet of said gas per 100 gallons of said brine.

5. The process according to claim 4 wherein the flow rate is between about 4 and about 7 standard cubic feet of gas per 100 gallons of brine.

References Cited

UNITED STATES PATENTS

| | | | |
|---|---|---|---|
| 1,543,324 | 6/1925 | De Raeve | 210—44 X |
| 2,162,379 | 6/1939 | Dole et al. | 210—44 X |

MICHAEL E. ROGERS, *Primary Examiner.*